US010762643B2

(12) United States Patent
Buczko et al.

(10) Patent No.: US 10,762,643 B2
(45) Date of Patent: Sep. 1, 2020

(54) METHOD FOR EVALUATING IMAGE DATA OF A VEHICLE CAMERA (71) Applicant: Continental Teves AG & Co. OHG, Frankfurt am Main (DE)

(72) Inventors: Martin Buczko, Darmstadt (DE); Volker Willert, Darmstadt (DE); Tim Kalbfuss, Frankfurt am Main (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 113 days.

(21) Appl. No.: 16/301,937

(22) PCT Filed: May 22, 2017

(86) PCT No.: PCT/DE2017/200044
§ 371 (c)(1),
(2) Date: Nov. 15, 2018

(87) PCT Pub. No.: WO2017/206999
PCT Pub. Date: Dec. 7, 2017

(65) Prior Publication Data
US 2019/0311485 A1 Oct. 10, 2019

(30) Foreign Application Priority Data

Jun. 1, 2016 (DE) .................. 10 2016 209 625

(51) Int. Cl.
*G06T 7/246* (2017.01)
*G06T 7/285* (2017.01)
*G06T 7/00* (2017.01)

(52) U.S. Cl.
CPC .............. *G06T 7/248* (2017.01); *G06T 7/246* (2017.01); *G06T 7/285* (2017.01); *G06T 7/97* (2017.01);

(Continued)

(58) Field of Classification Search
CPC .............. G06T 7/246; G06T 7/248; G06T 2207/30244; G06T 2207/30252;
(Continued)

(56) References Cited

U.S. PATENT DOCUMENTS 9,772,191 B2    9/2017  Staehlin et al.
2011/0313665 A1 12/2011 Lueke et al.
(Continued)

FOREIGN PATENT DOCUMENTS

WO   WO 2010/099789   9/2010
WO   WO 2013/037840   3/2013

OTHER PUBLICATIONS

English translation of the International Search Report of the International Searching Authority for International Application PCT/DE2017/200044, dated Sep. 4, 2017, 3 pages, European Patent Office, HV Rijswijk, Netherlands.
(Continued)

*Primary Examiner* — Diane D Mizrahi
(74) *Attorney, Agent, or Firm* — W. F. Fasse (57) ABSTRACT A method and a device for evaluating image data of a vehicle camera, involves:
a) recording a first image by the vehicle camera,
b) recording a subsequent second image by the vehicle camera,
c) extracting multiple correspondent features in the first and second images,
d) assuming a motion of the vehicle camera (motion hypothesis) between the recordings of the first image and the second image,
e) determining a reprojection error of an extracted feature, which indicates the difference between the flow measured from the feature extracted in the first and second images and the flow calculated from the motion hypothesis, and (Continued)

f) establishing outliers, wherein an extracted feature is established as an outlier if the reprojection error of this feature reaches or exceeds a threshold, wherein the threshold is not constant within an iteration that includes at least steps b) to g). This offers an improved detection and removal of outliers to estimate the motion of the vehicle camera.

17 Claims, 3 Drawing Sheets

(52) U.S. Cl.
CPC ............... *G06T 2207/10012* (2013.01); *G06T 2207/20012* (2013.01); *G06T 2207/30244* (2013.01); *G06T 2207/30252* (2013.01)

(58) Field of Classification Search
CPC . G06T 2207/10016; G06T 2207/10028; G06T 2207/10021; G06T 2207/20048; G06T 2207/30256; G06T 2207/20021; G06T 2207/20228; G06T 2207/30261
See application file for complete search history.

(56) References Cited

U.S. PATENT DOCUMENTS

| | | | |
|---|---|---|---|
| 2018/0188027 A1* | 7/2018 | Zhang | G06K 9/6212 |
| 2018/0284802 A1* | 10/2018 | Tsai | G06K 9/00664 |
| 2019/0121364 A1* | 4/2019 | Tsai | G06T 7/246 |

OTHER PUBLICATIONS

PCT International Preliminary Report on Patentability including English Translation of PCT Written Opinion of the International Searching Authority for International Application PCT/DE2017/200044, dated Dec. 4, 2018, 11 pages, International Bureau of WIPO, Geneva, Switzerland.

German, German Search Report for German Patent Application No. 10 2016 209 625.7, dated Mar. 27, 2017, 9 pages, German Patent and Trademark Office, Muenchen, Germany, with partial English translation, 6 pages.

Niko Sünderhauf et al., "Visual Odometry Using Sparse Bundle Adjustment on an Autonomous Outdoor Vehicle", In: "Autonome Mobile Systeme 2005: 19. Technical Talk, Stuttgart, Germany, Dec. 8-9, 2005", Springer Verlag, Berlin, Germany, XP055400242, ISBN: 978-3-540-30291-9, 7 pages (pp. 157-163).

Hernán Badino et al., "A Head-Wearable Short-Baseline Stereo System for the Simultaneous Estimation of Structure and Motion", 12th IAPR Conference on Machine Vision Applications (MVA), Nara, Japan, Jun. 13-15, 2011, XP055400250, 5 pages, retrieved from URL:http://ri.cmu.edu/pub_files/2011/6/badino_mvall.pdf on Aug. 22, 2017.

Georg Klein et al., "Parallel Tracking and Mapping for Small AR Workspaces", 6th IEEE and ACM International Symposium on Mixed and Augmented Reality, 2007, ISMAR 2007, Piscataway, NJ, USA, Nov. 13, 2007, XP058089591, ISBN: 978-1-4244-1749-0, 10 pages (pp. 1-10).

Georg Klein, "PTAM-GPL/Tracker.cc at master . Oxford-PTAM/PTAM-GPL . GitHub", http://www.robots.ox.ac.uk/~gk/publications/KleinMurray2007ISMAR.pdf, Oct. 24, 2013, XP055400528, http://www.robots.ox.ac.uk/~gk/PTAM/, retrieved from URL:https://github.com/Oxford-PTAM/PTAM-GPL/blob/master/Src/Tracker.cc, on Aug. 23, 2017.

Martin Buczko et al., "How to Distinguish Inliers from Outliers in Visual Odometry for High-Speed Automotive Applications", 2016 IEEE Intelligent Vehicles Symposium (IV), Gothenburg, Sweden, Jun. 19, 2016, XP032939007, pp. 478 to 483.

Martin Buczko et al., "Flow-Decoupled Normalized Reprojection Error for Visual Odometry", 2016 IEEE 19th International Conference on Intelligent Transportation Systems (ITSC), Nov. 2016, XP033028486, 7 pages (pp. 1161-1167).

Martin Buczko et al., "Monocular Outlier Detection for Visual Odometry", 2017 IEEE Intelligent Vehicles Symposium (IV), Jun. 11, 2017, XP033133836, 7 pages (pp. 739-745).

Bernd Kitt et al., "Monocular Visual Odometry Using a Planar Road Model to Solve Scale Ambiguity", in Proc. of the European Conference on Mobile Robots, Örebro, Sweden, Sep. 2011, pp. 1 to 6.

Bernd Kitt et al., "Visual Odometry Based on Stereo Image Sequences with RANSAC-Based Outlier Rejection Scheme", IEEE Intelligent Vehicles Symposium, 2010, 7 pages.

Jianbo Shi et al., "Good Features to Track", IEEE Conference on Computer Vision and Pattern Recognition (CVPR94), Seattle, Jun. 1994, 8 pages.

Mikael Persson et al., "Robust Stereo Visual Odometry from Monocular Techniques", IEEE Intelligent Vehicles Symposium (IV 2015), 2015, 7 pages.

Jean-Yves Bouguet, "Pyramidal Implementation of the Lucas Kanade Feature Tracker Description of the Algorithm", Intel Corporation, 2001, pp. 1 to 9.

Andreas Geiger et al., "StereoScan: Dense 3d Reconstruction in Real-Time", Intelligent Vehicles Symposium, 2011, 6 pages.

Andreas Geiger et al., "Are we Ready for Autonomous Driving? The KITTI Vision Benchmark Suite", Conference on Computer Vision and Pattern Recognition (CVPR), 2012, 8 pages.

http://www.cvlibs.net/datasets/kitti/eval_odometry.php., The KITTI Vision Benchmark Suite, A project of Karlsruhe Institute of Technology and Toyota Technological Institute of Chicago, 6 pages.

\* cited by examiner

METHOD FOR EVALUATING IMAGE DATA OF A VEHICLE CAMERA

FIELD OF THE INVENTION

The invention relates to a method and a device for evaluating image data of a vehicle camera and can, in particular, be used to reconstruct the motion of the vehicle camera within the framework of a camera-based driver assistance system.

BACKGROUND INFORMATION

Visual odometry makes it possible to calculate the motion of a camera system from a sequence of images. In the case of a stereo system, the rotation about all three axes, as well as the translation along the axes and, consequently, the motion in all six degrees of freedom can be reconstructed. This information can be used as an estimate of the current driving states for different driver assistance systems such as e.g. anti-lock braking system (ABS), electronic stability control (ESC), cruise control or roll stability control (RSC).

Nowadays, a combination of different sensors is used for the self-localization of vehicles. These include, for example, rotational speed sensors, acceleration sensors, odometry and GPS systems.

In order to increase the accuracy of the determination of the vehicle's own position—but in particular also the availability—in critical scenarios such as street canyons or tunnel scenarios, camera-based egomotion estimates are very important as an alternative sensor concept, in order to extend the previous sensor concept with an additional and independent sensor source.

WO 2013/037840 A1 discloses a method for determining position data of a vehicle. Driving dynamics data of the vehicle are measured. Position data of the vehicle are measured with an environment sensor which acquires the position data on the basis of at least one distance from a stationary object arranged with respect to the vehicle. Finally, position data of the vehicle are determined on the basis of the driving dynamics data and the position data. Here, a vehicle camera can be used as an environment sensor.

WO 2010/099789 A1 discloses a method for automatically detecting a driving maneuver of a motor vehicle, in particular a passing maneuver or an evasive maneuver. In this case, data from the vehicle sensor technology and lane marker detection based on data from the video sensor technology can be fused in the odometry. The odometry makes it possible to estimate the position, speed and orientation of the vehicle on the lane as well as additional state variables. These estimated variables can be made available to maneuver detection, other situation analysis algorithms or for control tasks.

In addition, the information from a camera-based egomotion estimate can be used as input for any dead reckoning approach to estimate the trajectory and location of the egovehicle. With such approaches, the own location can be continuously estimated, taking account of a starting position and the subsequent course of the motion and speed (translation and rotation).

Due to the high level of accuracy that can be achieved, the information can furthermore be combined for each time step and can be used to reconstruct the trajectory or respectively for localizing the vehicle—for example as a source of information for risk assessments, trajectory planning, car2X exchange of information right up to autonomous driving.

These data can be used, for example, to supplement an existing GPS system and to support it in critical situations. The need for this is demonstrated, for example, by investigations, according to which GPS availability is only 30% in Hong Kong or Calgary, for example.

A value of only 10% availability has even been established for construction site scenarios, which are very similar to street canyons.

Visual odometry can provide considerable support in precisely these scenarios since, in contrast to GPS receivers, it is not reliant on external signals. A distinction can be made between visual odometry systems, for example, based on the time window of their calculation. In addition to calculating motions between two consecutive time steps, additional information can be used from less recent time steps. Here, a distinction can be made between Simultaneous Localization and Mapping (SLAM) and Bundle Adjustment. Whereas in the case of SLAM, mapping is also carried out in addition to estimating egomotion, the aim of Bundle Adjustment is to improve the egomotion estimate by subsequently optimizing the triangulated spatial points.

Challenging situations for camera-based systems include, in particular, an insufficient number of correspondences of static scene points, heavily changing illumination and low brightness, an unstructured environment with homogeneous, non-textured surfaces, or an improperly low frame rate. High-speed scenarios such as, for example, along freeways or country roads combine several of these problems, making them one of the most challenging situations. Especially, the loss of or respectively the significantly lower number of suitable near features (correspondences) complicates the estimation of the egomotion.

The essential part of any visual odometry system is the detection of outliers. A variety of methods for detecting outliers are known. Purely flow-based approaches are based on the assumption that the optical flow follows patterns which are induced by the egomotion of the vehicle. Furthermore, model-based approaches exist, which explicitly constrain the flow using a certain motion model. Many known methods use reprojection error-based approaches.

B. Kitt et al. demonstrate, for example, in the publication *Visual odometry based on stereo image sequences with ransac-based outlier rejection scheme*, IEEE Intelligent Vehicles Symposium, 2010, the calculation of a feature-based reprojection error for removing outliers, which is compared with a constant threshold.

In the case of RANSAC methods, a minimum number of correspondences selected at random is used, in each iteration, to create a motion hypothesis. Then, a score for each feature is calculated that describes whether the feature supports the motion hypothesis. If the motion hypothesis achieves sufficient support from the features, the non-supporting features are rejected as outliers. Otherwise, a minimum number of correspondences is selected at random again.

Alternative methods can be bracketed together as "MASOR" methods (MAximum Subset Outlier Removal). Here, the maximum number of features is taken to calculate a motion hypothesis. This motion hypothesis and a subsequent outlier removal step are repeated in an iterative scheme. Then a support score is calculated for every feature. Instead of judging the motion hypothesis, the support score is interpreted as a measure for the quality of a feature, as the hypothesis is considered to be a good estimate. Non-supporting features are rejected and the next iteration starts with the remaining features. This process is repeated until a termination criterion is met.

SUMMARY OF THE INVENTION

It is an object of the present invention to indicate an improved outlier detection for a motion estimate by a vehicle camera.

A first aspect of the invention relates to the reconstruction of the motion in all six degrees of freedom (6-DOF motion) of vehicles by means of a vehicle camera as a standalone system, or in order to extend the sensor cluster. Since the vehicle camera for driver assistance applications is, as a general rule, integrated into the vehicle, the motion of the vehicle camera corresponds to the motion of the vehicle. A stereo camera represents a preferred embodiment of a vehicle camera.

The fundamental methodology of the visual odometry originates from mobile robotics. Significantly lower translation speeds are generally reached in this field than in the automotive sector. Due to the significantly higher speeds in the vehicle, significant errors occur in high-speed scenarios (country road, freeway) with the previous systems. A second aspect of the invention therefore relates to presenting a suitable method for high-speed scenarios.

Temporal and spatial image correspondences, which contain errors (e.g. moving objects, errors due to aliasing . . . ), are required to estimate the motion. The correspondence of a feature in a first image with the same feature in a second image is called image correspondence. A feature can, in particular, be an image detail (or respectively patch), an edge, a corner or an object. The first and the second image can be recorded by the same mono camera at different times or by two camera modules of a stereo camera at the same time. As a general rule, the respective image position (image coordinates) is of interest in the case of the correspondence of a feature in two images, whilst the time which has elapsed between the two recordings is also of interest in the case of images recorded consecutively in time.

Image correspondences can be judged by a so-called reprojection error. The reprojection error indicates the difference between the measured flow and the flow calculated from the motion hypothesis. If the reprojection error of a feature exceeds a boundary value, this feature is removed as an "outlier" from the final measurement, which is used to estimate the vehicle's egomotion.

Another aspect of the invention relates to the realization that a constant threshold for the reprojection error is not expedient for removing the outliers.

Another aspect of the invention is the realization that the reprojection error depends on the image coordinate of the observed correspondence relative to the image focal point as well as the depth of the observed measuring point. These dependencies can, in addition to a deterioration in the estimate, result in a complete breakdown of the estimate, since the influence due to the coordinates/depth results in a higher reprojection error than in the case of an erroneous correspondence with a "more favorable" coordinate/depth.

Another aspect of the invention is based on a careful analysis of the causes (see section I.), which then makes it possible to introduce anew criterion, which makes the estimate significantly more robust and increases the accuracy during a pure translation.

According to another aspect of the invention, this criterion can furthermore also be used in scenarios with rotation if knowledge of this is available. To this end, the flow induced by the rotation is simply compensated in the measured flow. However, this is not necessary in overland and freeway scenarios because of the low rotation in the cases investigated.

Consequently, an entire camera-based concept is created, which carries out the self-localization of vehicles with a high degree of accuracy and leads to better results in a significantly broader speed range.

A method according to the invention for evaluating image data of a vehicle camera comprises the following steps:

a) Recording of a first image by means of the vehicle camera, b) Recording of a subsequent second image by means of the vehicle camera, c) Extraction of multiple correspondent features in the first and the second image, d) Assumption of a motion of the vehicle camera (motion hypothesis) between the recording of the first and the second image, e) Determination of a reprojection error of an extracted feature, wherein the reprojection error indicates the difference between the flow measured from the feature extracted in the first and the second image and the flow calculated from the motion hypothesis, f) Establishment of outliers, wherein an extracted feature is established as an outlier if the reprojection error of this feature reaches or exceeds a threshold, g) wherein the threshold is not constant within an iteration step.

Here, at least steps b) to g) are part of an iteration step or, in other words, an iteration step comprises steps b) to g). In step c), the extraction of a (complete) set of correspondent features is, in particular, envisaged and in step e) the associated extraction error is then preferably determined for each extracted feature. Steps f) and g) are, in particular, to be understood to mean that the threshold is not the same for all of the features extracted in an iteration step. In the first iteration step, a translation with a predefined speed can, for example, be used as an assumption of the motion of the vehicle camera or respectively "initial motion hypothesis". Alternatively, data from other sensors in the vehicle can supply an initial motion hypothesis.

The method according to the invention offers an improved possibility of detecting outliers, which is known for schemes such as RANSAC and MASOR. The new way of creating a threshold can be quickly applied in the known methods, which establish the reprojection error, and it increases the robustness of the outlier detection.

According to one advantageous configuration of the invention, a threshold for an extracted feature is used in step f), which depends on a parameter (i.e. a quantifiable property) of the extracted feature.

The threshold preferably depends on the flow measured from the feature extracted in the first and the second image (i.e. in practice the displacement of the same feature in the first image compared with the second image). A case distinction can e.g. be advantageously made, wherein a constant threshold is applied to the reprojection error for very small flows which are below a minimum value, in order to guarantee the numerical robustness, whereas a different, in particular varying, threshold is applied in the case of larger flows.

The threshold is particularly preferably proportional to the measured flow of the extracted feature. That is the same as if the reprojection error usually used is normalized with the measured optical flow and a constant threshold is used. This change clearly allows correspondences with a large optical flow a larger error as well, which forces the use of close correspondences more strongly than the reprojection error. Mathematically, both the dependency of the error on the coordinate relative to the image focal point is removed, and the dependency of the depth in the relevant region is virtually completely compensated. This prevents the breakdown into more distant correspondences, which significantly lowers or respectively even prevents the resolution of the translation estimate. Advantageously, a rotational component of the motion can be compensated, in that the threshold is proportional to the flow following the compensation of the rotational component.

The threshold advantageously comprises a constant factor and a variable proportion, wherein the constant factor can be pre-defined, taking account of physical properties of the vehicle camera.

According to one preferred embodiment, the motion of the vehicle camera is reconstructed in an additional step h), taking account of the features, which are not removed as outliers in the current iteration step. In other words, only the inliers are used to reconstruct motion. Here, reconstructing can in particular mean that a new motion hypothesis is then calculated or the previous motion hypothesis is refined.

The motion of the vehicle camera reconstructed in step h) is preferably adopted for the following iteration step as a motion hypothesis for step d).

During a following iteration step the previous second image can be used as the new first image. Alternatively, step a) can also be carried out in the following iteration step.

The threshold or respectively the constant factor thereof is preferably lowered as the iteration progresses until such time as the desired accuracy is achieved.

The method can advantageously be used at high translational motion speeds of the vehicle camera or respectively of the vehicle, wherein high speeds are preferably larger than or equal to 30 km/h, in particular larger than or equal to 50 km/h.

The reconstructed vehicle camera motion is preferably enlisted for self-localization.

The reconstructed vehicle camera motion is advantageously used to determine the side slip angle of the vehicle in which the vehicle camera is arranged.

According to one preferred embodiment, the reconstructed vehicle camera motion is used to determine the wheel diameter of the vehicle in which the vehicle camera is arranged. Here, the distance covered results from the reconstruction, and the wheel diameter can be approximately determined by means of a wheel speed value (e.g. from the vehicle sensor cluster).

The vehicle camera can be advantageously calibrated by a comparison between the reconstructed vehicle camera motion and the motion of the vehicle established from other sensors.

The vehicle camera is preferably a stereo camera. Alternatively, the vehicle camera can also be a different camera, provided that the data thereof allow the reconstruction of a depth image, in particular TOF (time of flight) cameras such as e.g. HiRes flash lidar, but a 3D scene reconstruction is also possible from mono image data—at least approximately, by means of the assumption of a level subsurface, see e.g. Kitt et al. Monocular Visual Odometry using a Planar Road Model to Solve Scale Ambiguity, in Proc. of the European Conference on Mobile Robots, Orebro, Sweden, September 2011.

The invention furthermore relates to a device which is configured to carry out a method according to the invention, for example in the form of a control device for the vehicle camera.

By means of the application of a method according to the invention, we were able to exceed the quality of the results of the competing camera-based algorithms as of a speed of approximately 65 km/h. Even the results of laser scanners succumb to our method. The improvement in the accuracy achieved for very low additional computational cost results in improved products for vehicle localization and estimating the driving state.

BRIEF DESCRIPTION OF THE DRAWINGS

Embodiment examples of the invention are explained in greater detail below and partially illustrated with reference to Figures, wherein.

DETAILED DESCRIPTION OF EXAMPLE EMBODIMENTS OF THE INVENTION

An outlier can be determined as follows.

The main problem of visual odometry is distinguishing the suitable features—the inliers—from the non-suitable features—the outliers—from all of the extracted features. This is usually done by selecting only features with reliable measurements and defining some criterion to evaluate how well these measurements fit to some hypothesis of an estimated motion.

The reliability of measurements has two aspects:

First, the reliability of the determination of feature correspondences for calculating the disparity. Unambiguousness of a correspondence of features in the right and the left image.

Second, the accuracy of these correspondences is limited by the resolution of the images. So even if the correspondence of a feature in the right and in the left image is unambiguous the smaller the distance of the correspondent features, i.e. their disparity, the less accurate the pose change can be determined. Ultimately, the resolution of the reconstructed depth reduces quadratically with the distance.

Consequently, near features with highly confident correspondence values could be selected as suitable features.

The pose change of the camera from time t−1 to t is given by the translation vector T and the rotation matrix R (of the camera motion).

Since the camera for driver assistance applications is, as a general rule, integrated into the vehicle, the motion of the camera corresponds to the motion of the vehicle.

I. How to Define an Outlier?

The starting point is the classical least squares estimator:

$$(\hat{R}, \hat{T}) = \mathrm{argmin}_{R,T} \sum_{i=1}^{N} (\varepsilon_i^t)^2, \tag{1}$$

$$\varepsilon_i^t = \|x_i^{t-1} - \pi(R\lambda_i^t x_i^t + T)\|_2, \tag{2}$$

where the norms $\varepsilon_i^t$ are called the reprojection errors for each feature indexed by i at time t within the feature set $\mathcal{F}^t=\{f_i^t\}_{i=1}^N$. Here, $\{x_i^{t-1},x_i^t\}\in\mathbb{R}^3$ is the correspondent pair of coordinates denoted in homogeneous normalized image coordinates $x_i^t=[x_i^t, y_i^t, 1]^T$ for all 3D points $p_i \in \mathbb{R}^3$ with camera coordinates $X_i^t=[X_i^t, Y_i^t, Z_i^t]^T=\lambda_i^t x_i^t$. The pose change of the camera from time t-1 to t is given by the 3D translation vector $T=[t_x,t_y,t_z]^T\in\mathbb{R}^3$ and the rotation matrix $R\in SO(3)$, wherein the space of the rotation matrices is indicated by $SO(3):=\{R\in\mathbb{R}^{3\times 3}|R^T R=I, \det(R)=1\}$, and $\pi$ denotes the standard planar projection $[X,Y,Z]^T \mapsto [X/Z, Y/Z,1]^T$.

Figure 1:
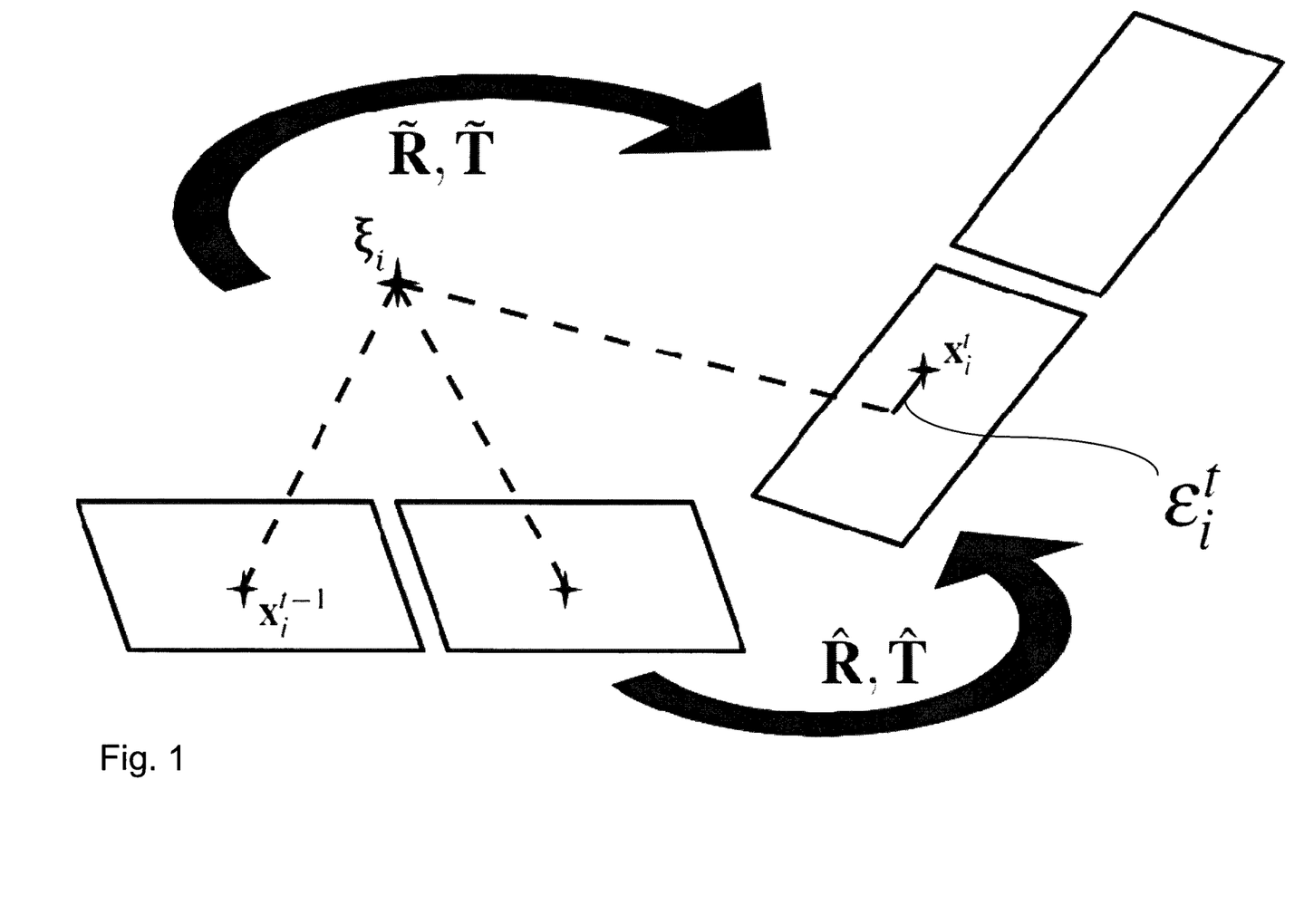
FIG. 1 schematically shows how a feature in the real space $\xi_i$ is imaged by a moving vehicle camera.

FIG. 1 schematically illustrates these relationships. A feature $\xi_i$ in the real space is imaged at time t-1 by a vehicle camera, wherein the image coordinate $x_i^{t-1}$ is produced for this feature.

In FIG. 1, the vehicle camera is a stereo camera (shown as two adjacent parallelograms which each symbolize one camera module), which in each case generates a pair of images consisting of a left and a right image at a recording time. This represents one possible way of establishing the depth of the feature by means of triangulation or respectively by determining the disparity. The disparity is given by the displacement of the correspondent feature $x_i^{t-1}$ in the left and the right image.

A method according to the invention is, however, not restricted to the stereo camera as the vehicle camera, since other cameras also make it possible to reconstruct a depth image, in particular TOF cameras such as e.g. HiRes flash lidar, but a 3D scene reconstruction is also possible, at least approximately, from mono image data.

The projection, for example, of the spatial point $\xi_i$ relative to the left camera onto the left image $x_i^{t-1}$ is indicated in FIG. 1 by the dashed line.

The camera subsequently changes its pose by means of translation and rotation (camera motion). At time t, the camera images the feature at the image coordinate $x_i^t$. The camera can now be moved virtually in the space by means of the hypothesis of the motion of the camera and, taking account of the imaging property of the camera, it can be calculated where the feature $\xi_i$ is imaged in the next image (projection). The deviation of this position from the actual image coordinate $x_i^t$ (continuous line) corresponds to the reprojection error $\varepsilon_i^t$.

Following the classical visual odometry procedure, it is assumed that for each point $p_i$ the depth $\lambda_i^t\in\mathbb{R}$ is measured by some stereo vision algorithm, the image coordinates $x_i^{t-1}$ are extracted by some feature detector and the correspondent image coordinates in the next frame $x_i^t$ are measured by some optical flow algorithm.

To find the optimal estimate of the pose change $(\hat{R},\hat{T})$ by means of minimizing the objective in accordance with equation (1) with an iterative gradient descent method (e.g. Gauss-Newton or Levenberg-Marquardt method), some initial estimate of the pose change has to be given.

Now, we are faced with the main problem of visual odometry: Given the set of all of the extracted features, we need to find suitable features—the inliers—and reject all other features from the set—the outliers. This is usually done by selecting only features with reliable measurements $\{\lambda_i^t, x_i^{t-1}, x_i^t\}$ and defining some criterion to evaluate how well these measurements fit to some hypothesis of the estimated pose change $(\tilde{R},\tilde{T})$.

The reliability of a measurement has two aspects. First, since, in stereo vision, depth $\lambda_i^t=b/d_i^t$ is reconstructed from disparity $d_i^t$ using a stereo camera with a fixed known baseline b and both the disparity $d_i^t$ and the pairs $\{x_i^{t-1},x_i^t\}$ are based on a correspondence search, only unambiguous correspondences, e.g. not facing the aperture problem, should be taken into account. Second, the accuracy of these correspondences is limited by the resolution of the images. So even if the correspondences are unambiguous the smaller their distances $\|x_i^t-x_i^{t-1}\|$ and $d_i^t$, the less accurately the pose change can be estimated. This is because the ratios $\|x_i^t-x_i^{t-1}\|/\Delta p$ and $d_i^t/\Delta p$ between distances $\|x_i^t-x_i^{t-1}\|$, $d_i^t$ and the limited image resolution $\Delta p$ become smaller with smaller image-distances and thus the signal-to-resolution ratio decreases. Especially for the accuracy of the reconstructed depth $\lambda_i^t=b/d_i^t$; this is crucial because the depth $\partial\lambda_i^t\infty\partial d_i^t(\lambda_i^t)^2$ reduces quadratically with distance.

Considering these facts, it seems to be easy to figure out good features. Near features with large optical flow that are based on highly confident correspondence estimates should be chosen. Additionally, each feature has to fulfill the epipolar constraint for one optimal estimate $(\hat{R},\hat{T})$, thus the features only have to be projections of static points in the scene.

Since we cannot guarantee that the measurements are all confident and we do not have the optimal pose change at hand, we need to find a good hypothesis $(\tilde{R},\tilde{T})$ and a proper criterion to keep as many suitable features as possible.

This is a chicken-and-egg problem. To resolve it, the reprojection error in accordance with equation (2) is investigated in greater detail in two ways: On the one hand, it should be used as the criterion to remove outliers and, on the other hand, the reproduction error should improve the hypothesis of the pose change given the inliers. In order to combine both subproblems in an alternating scheme, it is figured out how to use the reprojection error for both subtasks such that as many inliers as possible can be kept, which also leads to a more accurate estimate of the pose change.

To find a good criterion for the outlier removal, we examine the dependency of the reprojection error on the values of the measurements assuming error-free measurements $\{\hat{\lambda},\hat{x}_i^{t-1},\hat{x}_i^t\}$ and an imprecise pose change hypothesis $(\tilde{R},\tilde{T})$. For improving the pose change hypothesis, we assume error-prone measurements $\{\tilde{\lambda},\tilde{x}_i^{t-1},\tilde{x}_i^t\}$ and try to maximize the improvement of the iterative pose change estimation $(\hat{R},\hat{T})$ by using the knowledge about the dependency of the reprojection error again.

Figure 2:
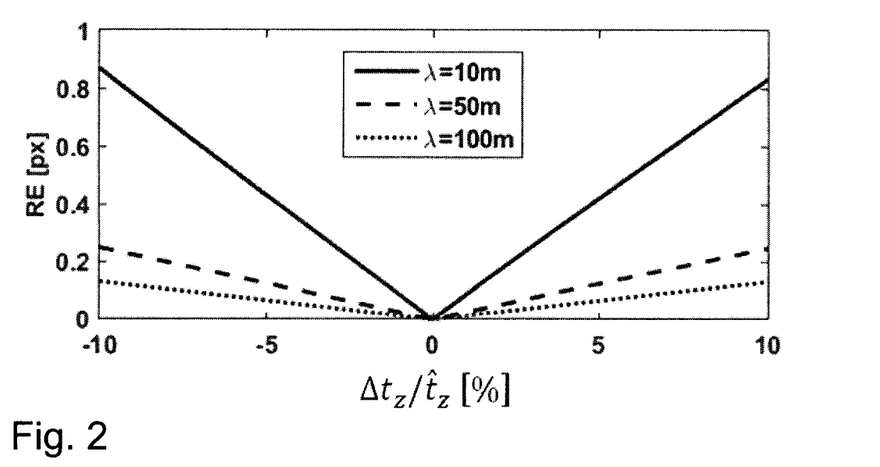
FIG. 2 shows the dependency of the reprojection error on the error of the speed estimate for different error-free feature depths.

As is known from Shi and Tomasi, Good features to track, in IEEE Conference on Computer Vision and Pattern Recognition, Proceedings, 1994, high translation estimate errors occur at large longitudinal pose changes along the optical axis. The translation estimates become especially poor for long distance features, see Persson et al., Robust stereo visual odometry from monocular techniques, in IEEE Intelligent Vehicles Symposium, 2015. To obtain a first impression on the consequences for this sensitivity in such driving scenarios FIG. 2 shows the dependency of the reprojection error $\varepsilon_i^t$ or respectively RE in pixels [px] for an error-prone translation estimate $\tilde{t}_z=\hat{t}_z+\Delta t_z$ in the z-direction with $\hat{t}_z=100$ km/h applied via the relative error of the speed estimate $\Delta t_z/\hat{t}_z$ at an interval of $[-10\%, 10\%]$ for three different (error-free) feature depths $\hat{\lambda}_i^t$ of 10, 50 and 100 meters. FIG. 2 clearly shows that the reprojection error (RE) linearly increases with increasing translation error but the sensitivity of the reprojection error (the slope of the lines) decreases with increasing distance (or respectively depth) of the features.

With a constant threshold for removing outliers, close features (with low depth) would be very quickly rejected. However, this produces a poorer estimate of the translation overall, since in the case of more distant features which are not rejected as quickly as outliers, the signal-to-noise ratio worsens and these features cannot be usefully exploited any more.

A. The Reprojection Error in High-Speed Scenarios

For error-free measurements $\{\hat{\lambda}_i^t, \hat{x}_i^{t-1}, \hat{x}_i^t\}$ and the optimal motion estimate $(\hat{R}, \hat{T})$, the reprojection error (2) becomes zero because the following applies:

$$\hat{x}_i^{t-1} = \pi(\hat{R}\hat{\lambda}_i^t \hat{x}_i^t + \hat{T}), \forall i, t \tag{3}$$

In order to find a proper threshold for removing outliers, some motion error range $(\Delta R, \Delta T)$ has to be defined in addition to the optimal motion estimate $(\hat{R}, \hat{T})$ $(\tilde{R}, \tilde{T}) = (\hat{R}, \hat{T}) + (\Delta R, \Delta T)$ to find the reprojection error range given the error-prone motion and error-free measurements. This results in the following dependency of the reprojection error $$\Delta \varepsilon_i^t = \|\hat{x}_i^{t-1} - \pi(\tilde{R}\hat{\lambda}_i^t \hat{x}_i^t + \tilde{T})\|_2, \forall i, t \tag{4}$$

Now, we can assume very small rotations for high-speed scenarios.

1. High-Speed Approximation $$R \approx I \tag{5}$$

thus the rotation matrix approximately equals the identity matrix and longitudinal movements are much larger than horizontal movements, thus the components of the translation are approximately equal to zero:

2. High-Speed Approximation $$t_x, t_y \approx 0. \tag{6}$$

Applying approximations (5) and (6) produces an approximation of the sensitivity of the reprojection error (4) at high speeds for an error-prone motion hypothesis, which reads $$\Delta \varepsilon_i^t \approx \left\| \begin{pmatrix} \frac{\hat{\lambda}_i^t \hat{x}_i^t}{\hat{\lambda}_i^t + \hat{t}_z} - \frac{\hat{\lambda}_i^t \hat{x}_i^t}{\hat{\lambda}_i^t + \hat{t}_z + \Delta t_z} \\ \frac{\hat{\lambda}_i^t \hat{y}_i^t}{\hat{\lambda}_i^t + \hat{t}_z} - \frac{\hat{\lambda}_i^t \hat{y}_i^t}{\hat{\lambda}_i^t + \hat{t}_z + \Delta t_z} \end{pmatrix} \right\|_2 \tag{7}$$

$$= \left| \frac{\hat{\lambda}_i^t \Delta t_z}{(\hat{\lambda}_i^t + \hat{t}_z)(\hat{\lambda}_i^t + \hat{t}_z + \Delta t_z)} \right| \|\hat{x}_i^t\|_2. \tag{8}$$

The sensitivity of the reprojection error is scaled by the absolute value of the image coordinate $\|\hat{x}_i^t\|_2$ and damped by the feature's depth $\hat{\lambda}_i^t$. This means that an incorrect motion hypothesis $\tilde{t}_z = \hat{t}_z + \Delta t_z$ with a fixed error range $\Delta t_z$ produces a variant sensitivity $\Delta \varepsilon_i^t$ dependent on the feature's position.

Thus, methods that are based on outlier removal by means of a constant threshold for the reprojection error remove close features, although the measurements are error-free (or error-prone to the same extent as more distant features).

This leads to the breakdown of outlier removal in high-speed scenarios for methods based on a constant threshold for the reprojection error.

As close features with high absolute values of their correspondences are lost during the outlier removal process, the sensitivity of the reprojection error against forward translation gets lost, as can be seen in FIG. 2.

In turn, this results in worse estimates of the translation because the signal-to-resolution ratio is becoming smaller and cannot be exploited anymore. To conclude, a reasonable threshold to judge the quality of a feature cannot be a constant value but must incorporate the depth and the length of the image coordinate in order to make a meaningful statement on the quality of a feature.

B. Almost Invariant Criterion for Outlier Removal

To reduce the dependency of the reprojection error on the feature position, we can either use a position adaptive threshold for outlier removal or normalize the reprojection error for coordinate $\|\hat{x}_i^t\|_2$ scaling and depth $\hat{\lambda}_i^t$ damping. Since the resolution of the measured depth values decreases with distance, and depth measurements are in general error-prone, we do not want to incorporate them to compensate the depth damping of the reprojection error. Instead, we use the dependency of the absolute value of the optical flow on the depth and use the optical flow measurements to normalize the reprojection error as follows: The error-free absolute value of a feature's optical flow induced by an error-free straight forward motion $\hat{t}_z$, again assuming (5) and (6) reads:

$$\|\hat{x}_i^{t-1} - \hat{x}_i^t\|_2 = \|\pi(\hat{R}\hat{\lambda}_i^t \hat{x}_i^t + \hat{T}) - \hat{x}_i^t\|_2 \tag{9}$$

$$\approx \left| \frac{\hat{t}_z}{\hat{\lambda}_i^t + \hat{t}_z} \right| \|\hat{x}_i^t\|_2. \tag{10}$$

Using the absolute value of the current optical flow as a normalization of the sensitivity of the reprojection error, we obtain $$\Delta \bar{\varepsilon}_i^t = \frac{\Delta \varepsilon_i^t}{\|\hat{x}_i^{t-1} - \hat{x}_i^t\|_2} \approx \left| \frac{\hat{\lambda}_i^t \Delta t_z}{\hat{t}_z(\hat{\lambda}_i^t + \hat{t}_z + \Delta t_z)} \right| \approx \left| \frac{\Delta t_z}{\hat{t}_z} \right|. \tag{11}$$

Here, the second approximation assumes the depth being much larger than the longitudinal motion $\hat{\lambda}_i^t \gg \hat{t}_z + \Delta t_z$.

For this reason, the normalized reprojection error is not scaled by the absolute value of the image coordinate anymore and is almost independent of the distance of distant features.

We therefore use the following case distinction, using a threshold $\varepsilon_{thresh}$ on the normalized reprojection error to mark each feature as a member of the current feature set:

$$f_i^t \begin{cases} \in \mathcal{F}^t, & \text{if } \bar{\varepsilon}_i^t = \frac{\varepsilon_i^t}{\|x_i^{t-1} - x_i^t\|_2} < \varepsilon_{thresh}, \\ \notin \mathcal{F}^t, & \text{else} \end{cases} \tag{12}$$

This criterion (as part of an outlier removal scheme as explained below) turns out to be very suitable for outlier removal, especially in high-speed scenarios, because it is almost independent of the features' 3D position.

A rotational component of the motion hypothesis can be compensated in that the reprojection error is normalized with the flow following the compensation of the rotational component. In the case of a reprojection error normalized in such a way $$\frac{\varepsilon_n^t(\hat{R}^t, \hat{T}^t)}{\|x_n^{t-1} - \pi(\hat{R}^t x_n^t)\|_2},$$

an external rotation estimate $\hat{R}^t$ is used to transform the measured image points on the right in the denominator such that the rotation of the vehicle is offset in the correspondence. As a result, only the flow through the translation remains. That means that we transform each scenario to the situation "free of rotation", which until now was the assumption for the applicability of the measure of the error in accordance with equation (12).

We use the same $\hat{R}^t$ constantly for calculating the reprojection error (we therefore only optimize according to $\hat{T}^t$).

Therefore, the described outlier detection can be used not only for high-speed scenarios (assuming freedom of rotation). This significantly extends the scenarios in which the method leads to improvements.

Here, the indices t and t−1 represent the time of the estimate, while n represents the observed feature.

Figure 3:
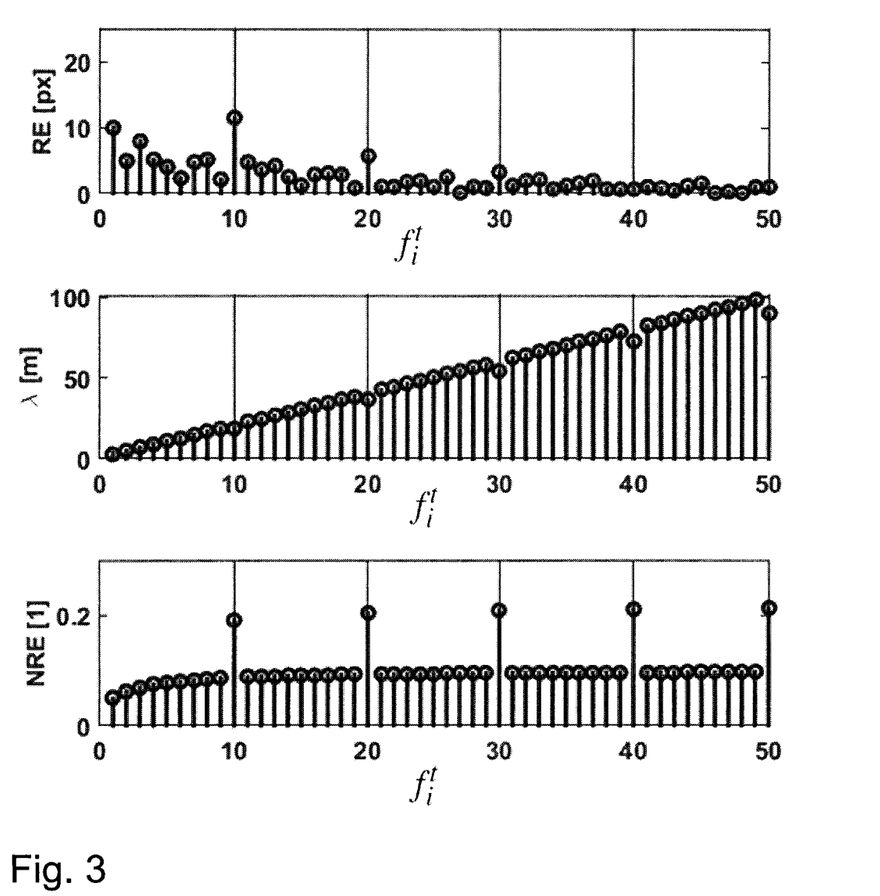
FIG. 3 shows a comparison between the reprojection error and the ratio of the reprojection error to the optical flow for features having different depths.

FIG. 3 shows a comparison between the reprojection error $\varepsilon_i^t$ or respectively RE in pixels (top) and the normalized reprojection error $\bar{\varepsilon}_i^t$ or respectively NRE (bottom) for a selection of different features, wherein each tenth feature $f_i^t$ has an error of the estimated depth $\lambda_i^t$ in meters of 10% (center) for a simulated forward motion $t_z$ of 100 km/h. The depths of the features start at 3 m for the first feature $f_1^t$ and extend up to 100 m for the $50^{th}$ feature $f_{50}^t$. The reprojection error $\varepsilon_i^t$ (FIG. 3, top) does not allow an expedient separation between outliers and inliers, because it scales with the absolute value of the coordinate of the features. By contrast, the normalized reprojection error $\bar{\varepsilon}_i^t$ (FIG. 3, bottom) makes possible a clear distinction of the outliers, as the normalized reprojection error of these features is larger by approximately a factor of two than the error-free features.

C. Hypothesis Refinement on the Inlier Set

One question has not yet been addressed: Since the normalized reprojection error (11) improves the outlier removal, is it also suitable for obtaining a better hypothesis for the least squares problem formulated in equation (1) ? Now, assuming error-prone measurements $\{\tilde{\lambda}_i^t, \tilde{x}_i^{t-1}, \tilde{x}_i^t\}$ and trying to minimize equation (1) to obtain a better pose change estimate $(\hat{R}, \hat{T})$ the features with measurements that possess a high resolution should contribute more to the estimate than measurements with low resolution. This can be realized with an extension of (1) to a weighted least squares problem that realizes a decrease of the weights for distant features and an increase of the weights for larger optical flow amplitudes. Looking at the approximation of the reprojection error in equation (8) for high longitudinal speeds, this weighting is intrinsically done by the reprojection error itself, whereas the normalized reprojection error would weight the features more or less equally. Thus, for refinement of the motion hypothesis based on the current set of inliers, the (un-normalized) reprojection error is already most suitable.

II. Incremental Alternating Outlier Removal and Pose Refinement Scheme

To realize an iterative optimization scheme that carefully alternates between incremental outlier rejection and pose change refinement, we need a suitable set of a reasonable number of features to start with. A suitable feature has unambiguous temporal as well as stereoscopic correspondence measurements to obtain as many reliable optical flow and depth estimates as possible.

A. Per Frame Initialization

Our initial feature set for every stereo-frame pair is created as follows applying only standard functions (e.g. of the OpenCV library):

We start with the feature selection using the Shi and Tomasi method $\mathscr{F}_0^t = \{x_i^{t-1}, x_i^t, \lambda_i^t\}_{j=1}^{N_0}$. For each feature the disparity at time t−1 is calculated using SAD-based block matching. For optical flow initialization, we triangulate each feature's position in three-dimensional space at time t−1 and reproject the features to the current frame at time t using a constant turn rate and velocity model based on the last estimated pose change (which is a variant of a motion model with predicted tracking by matching proposed in Persson et al. (see above)).

After that the optical flow for the left and the right image between time t−1 and t is refined with the Lucas-Kanade method in accordance with Bouguet, Pyramidal implementation of the affine lucas kanade feature tracker description of the algorithm, 2001, Intel Corp. 5. The final feature set with a starting number for initialization is reached via a left-right consistency check at time t for all remaining optical flow estimates (which is a variant of circular matching proposed in Geiger et al., Stereoscan: Dense 3d reconstruction in real-time, in Intelligent Vehicles Symposium, 2011).

B. Alternating Iteration Based on MAximum Subset of Outlier Removal (MASOR)

We iterate over p alternating between a) pose refinement keeping the current inlier set fixed and b) outlier removal keeping the current pose $(\hat{R}_p, \hat{T}_p)$:

a) Pose refinement starts with $\mathscr{F}_0^t$ at first iteration p=0. The pose estimate is initialized with the estimate of the last frame $\hat{R}_0^t = \hat{R}^{t-1}$ and $\hat{T}_0^t = \hat{T}^{t-1}$. In the following we omit the time index t for simplicity:

$$(\hat{R}_p, \hat{T}_p) = \mathrm{argmin}_{R,T} \sum_i (\varepsilon_i^t)^2, \forall f_i^t \in \mathscr{F}_{p-1}^t \quad (13)$$

b) For outlier removal, we apply our combined criterion for case distinction, which we call Robust Outlier Criterion for Camera-based Odometry (ROCC):

$$f_i^t \begin{cases} \in \mathscr{F}_p^t, & \text{if } \bar{\varepsilon}_i^t(\hat{R}_p, \hat{T}_p) < \bar{\varepsilon}_p^{thresh} \\ & \text{or } \varepsilon_i^t(\hat{R}_p, \hat{T}_p) < \varepsilon_p^{thresh}, \\ \notin \mathscr{F}_p^t, & \text{else} \end{cases} \quad (14)$$

The threshold $\bar{\varepsilon}_p^{thresh}$ therefore applies to the normalized reprojection error and is an example of a constant factor of the threshold, which can be predefined, taking account of physical properties of the vehicle camera. The first condition requires a sufficiently large optical flow, otherwise a normalization of the reprojection error is not possible (unstable). A small optical flow occurs, in particular, with more distant features. Alternatively, the second criterion intervenes, which then requires that the non-normalized reprojection error is below a low constant threshold $\varepsilon_p^{thresh}$. Therefore, the feature is considered to be an inlier for as long as at least one criterion is met.

Here, we increase the thresholds $\bar{\varepsilon}_p^{thresh}$ and $\varepsilon_p^{thresh}$ in a coarse to fine manner during the iterations.

When the number $N_p$ of the feature sets does not change anymore, a minimum number of features $N_{min}$ or a maximum number of iterations $p_{max}$ is reached. We terminate our robust pose estimation scheme and perform one last optimization run with the remaining features. This run is initialized with the rotation and translation direction from OpenCV's standard least median of squares 2D-2D five-point method.

III. Evaluation and Results from Comparison Measurements

The evaluation is based on the KITTI benchmark (http://www.cvlibs.net/datasets/KITTI or respectively Geiger et al. Are we ready for Autonomous Driving? The KITTI Vision Benchmark Suite, Conference on Computer Vision and Pattern Recognition (CVPR), (2012), which provides city, overland and freeway scenarios. More detailed information regarding the methods indicated below as comparison measurements (SOFT, cv4xvl-sc, V-LOAM, LOAM and DEMO) can be found at http://www.cvlibs.net/datasets/kitti/eval_odometry.php or respectively under 'Odometry' on the KITTI website.

In order to evaluate the performance of an embodiment example of the invention in high-speed scenarios, we first compare it with known visual odometry algorithms without additional sensor data for different speeds v in km/h: Our method was the first-placed purely camera-based method with an overall error of 0.98% on 11 Jan. 2016. The SOFT method ("Multi Frame Tracking, SOFT" in FIG. 4) achieved the second best overall result of the KITTI benchmark with a translation error TE of 1.03%. The authors use feature tracking on the basis of many images.

With an error of 1.09%, the algorithm cv4xvl-sc ("BA, cv4xvl-sc" in FIG. 4) shows a slightly worse quality. Here, the authors apply Bundle Adjustment to improve the motion estimation.

Figure 4:
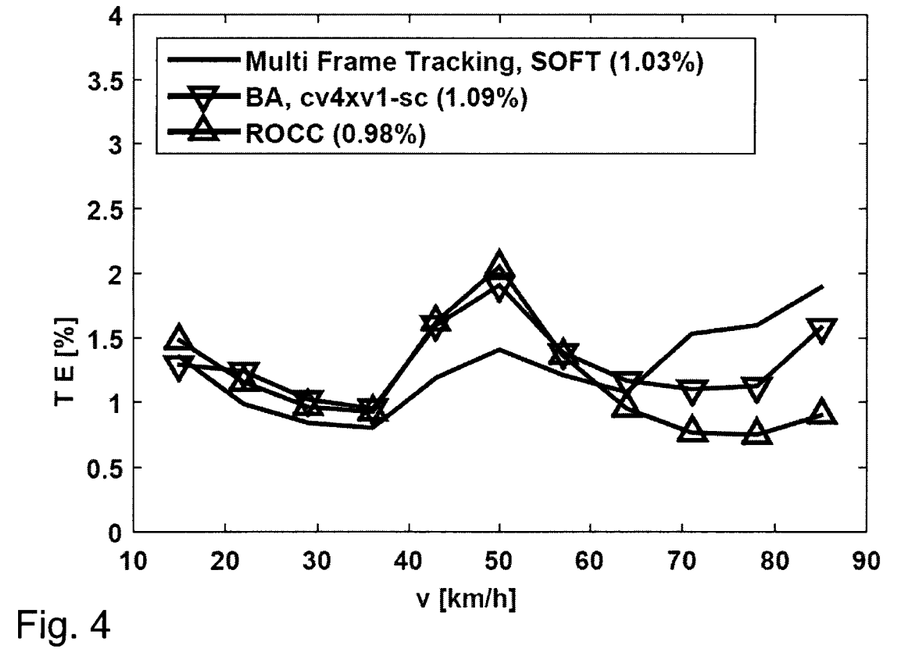
FIG. 4 shows a comparison between the measuring results of an embodiment example of the invention and the two best camera-based algorithms in the KITTI benchmark (status as at 11 Jan. 2016)

By contrast with these two algorithms, we do not use the feature's history, but only rely on the frame-to-frame information of the features. As shown in FIG. 4, this leads to an almost constant additional error in comparison to the two known methods. Despite the loss of precision due to not using the feature's history, our new outlier removal (ROCC) scheme leads to a lowered error as of a speed of approximately 65 km/h.

This shows that the application of our new error measure enables even a comparatively imprecise system to outperform the conventional methods. An extension by means of Bundle Adjustment in order to further increase the quality of our method is therefore possible.

In order to underline the performance in high-speed scenarios, we compare our results to methods that additionally incorporate the information from a high-precision laser scanner: With an error of 0.88% and 1.14%, the LOAM and DEMO methods reach a very high reconstruction quality. The top-ranked V-LOAM method even achieves an overall-error of 0.75%.

Figure 5:
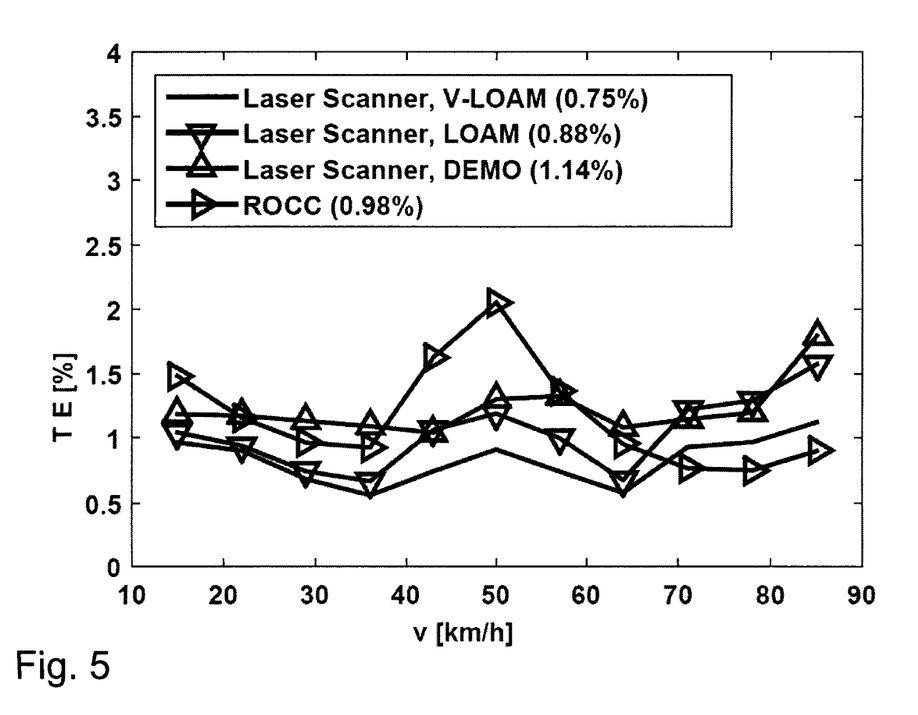
FIG. 5 shows a comparison between the measuring results of the three best stereo camera-based and laser-scanner based systems in the KITTI benchmark with an embodiment example of the invention.

FIG. 5 shows the results of a comparison between the measuring results of laser scanner systems and an embodiment example of the invention. It is true that the measuring accuracy of the camera-based system is inferior to that of the laser scanners overall. However, our careful outlier removal provides the best measuring results at speeds higher than 70 km/h.

At speeds of 70 km/h and more, our configuration consequently provides the best results in the KITTI benchmark of all the camera and laser scanner systems according to the prior art.

The invention claimed is:

1. A method of evaluating image data of a vehicle camera, comprising the following steps, wherein at least steps b) to f) are part of an iteration:
    a) recording a first image by the vehicle camera,
    b) recording a second image by the vehicle camera subsequent to the recording of the first image,
    c) extracting multiple correspondent features in the first image and the second image,
    d) establishing a motion hypothesis as an assumption of a motion of the vehicle camera between the recording of the first image and the recording of the second image,
    e) determining respective reprojection errors of respective extracted features among the multiple correspondent features, wherein the respective reprojection error indicates a difference between a measured flow that is measured from the respective extracted feature and a calculated flow that is calculated from the motion hypothesis, and
    f) establishing the respective extracted feature as an outlier when the reprojection error of this respective extracted feature reaches or exceeds a threshold,
    wherein a respective threshold value of the threshold is not the same for all of the extracted features that are extracted within one iteration of at least the steps b) to f).

2. The method according to claim 1, wherein the respective threshold value depends on at least one parameter of the respective extracted feature.

3. The method according to claim 2, wherein the at least one parameter comprises the measured flow that is measured from the respective extracted feature.

4. The method according to claim 3, wherein the respective threshold value is proportional to the measured flow that is measured from the respective extracted feature.

5. The method according to claim 1, wherein the respective threshold value comprises a constant factor and a variable component, wherein the constant factor is predefined, taking account of physical properties of the vehicle camera.

6. The method according to claim 5, wherein the constant factor of the threshold value is lowered during a following one of said iteration.

7. The method according to claim 1, further comprising removing those respective extracted features that were established as the outliers, and reconstructing the motion of the vehicle camera taking account of those extracted features that were not removed as the outliers in a current one of said iteration.

8. The method according to claim 7, wherein the motion of the vehicle camera reconstructed in the current iteration is established as the motion hypothesis in a following one of said iteration.

9. The method according to claim 7, wherein the method is used at translational motion speeds of the vehicle camera greater than or equal to 30 km/h.

10. The method according to claim 7, further comprising performing self-localization using the reconstructed motion of the vehicle camera.

11. The method according to claim 7, further comprising, based on the reconstructed motion of the vehicle camera, determining a side slip angle of the vehicle in which the vehicle camera is arranged.

12. The method according to claim 7, further comprising, based on the reconstructed motion of the vehicle camera, determining a wheel diameter of the vehicle in which the vehicle camera is arranged.

13. The method according to claim 7, further comprising calibrating the vehicle camera by comparing the reconstructed motion of the vehicle camera and a motion of the vehicle established from other sensors.

14. The method according to claim 7, wherein the method is used at translational motion speeds of the vehicle camera greater than or equal to 50 km/h.

15. The method according to claim 1, wherein the vehicle camera is a stereo camera.

16. The method according to claim 1, wherein the threshold value is lowered during a following one of said iteration.

17. A device comprising a control device for evaluating image data of a vehicle camera, wherein the control device is configured to carry out the following steps, wherein at least steps b) to f) are part of an iteration:
   a) recording a first image by the vehicle camera,
   b) recording a second image by the vehicle camera subsequent to the recording of the first image,
   c) extracting multiple correspondent features in the first image and the second image,
   d) establishing a motion hypothesis as an assumption of a motion of the vehicle camera between the recording of the first image and the recording of the second image,
   e) determining respective reprojection errors of respective extracted features among the multiple correspondent features, wherein the respective reprojection error indicates a difference between a measured flow that is measured from the respective extracted feature and a calculated flow that is calculated from the motion hypothesis, and
   f) establishing the respective extracted feature as an outlier when the reprojection error of this respective extracted feature reaches or exceeds a threshold,
   wherein a respective threshold value of the threshold is not the same for all of the extracted features that are extracted within one iteration of at least the steps b) to f).

\* \* \* \* \*

UNITED STATES PATENT AND TRADEMARK OFFICE
CERTIFICATE OF CORRECTION

PATENT NO. : 10,762,643 B2
APPLICATION NO. : 16/301937
DATED : September 1, 2020
INVENTOR(S) : Martin Buczko et al.

It is certified that error appears in the above-identified patent and that said Letters Patent is hereby corrected as shown below:

In the Specification

Column 3,
Line 58, after "introduce", replace "anew" with --a new--

Column 5,
Line 59, after "Robots,", replace "Orebro," with --Örebro--

Column 7,
Line 3, after "set", replace the equation to read:
$$\mathscr{F}^t = \{f_i^t\}_{i=1}^N$$

Column 8,
Lines 7 and 8, after "ratios", replace the mathematical expression to read:
$\|x_i^t - x_i^{t-1}\|/\Delta p$ (no line break)
Line 39, after "ments", replace the mathematical expression to read:
$$\{\hat{\lambda}_i^t, \hat{x}_i^{t-1}, \hat{x}_i^t\}$$
Line 41, replace the equation to read:
$$\{\tilde{\lambda}_i^t, \tilde{x}_i^{t-1}, \tilde{x}_i^t\}$$

Column 9,
Line 17, replace the equation to read:
$$\Delta \varepsilon_i^t = \|\tilde{x}_i^{t-1} - \pi(\tilde{R}\hat{\lambda}_i^t \tilde{x}_i^t + \tilde{T})\|_2, \quad \forall i,t. \qquad (4)$$
Line 23, replace the mathematical expression to read:
R ≈ I, (5)

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*

Line 50, after "hypothesis", replace the equation to read:
$\tilde{t}_z = \hat{t}_z + \Delta t_z$ Column 11,
Line 65, after "method", replace the equation to read:
$\mathcal{F}_0^t = \{\mathbf{x}_i^{t-1}, \mathbf{x}_i^t, \lambda_i^t\}_{i=1}^{N_0}$.